3,275,638
6-HYDROXYMORPHINAN DERIVATIVES AND PRODUCTION THEREOF

Yoshiro Sawa, Hyogo Prefecture, and Naoki Tsuzi and Haruhiko Tada, Osaka Prefecture, Japan, assignors to Shionogi & Co., Ltd., Fukushima-ku, Osaka, Japan
No Drawing. Filed Apr. 4, 1963, Ser. No. 270,558
Claims priority, application Japan, Apr. 9, 1962, 37/14,250
1 Claim. (Cl. 260—285)

The present invention relates to 6-hydroxymorphinan derivatives and production thereof.

In the term "morphinan" herein employed, there are included all the compounds having a fundamental structure representable by the following plane formula:

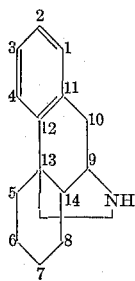

Accordingly, the term "morphinan" means not only normal morphinan (cis-1,3,4,9,10,10a-hexahydro-2H-10,4a-iminoethanophenanthrene) but also isomorphinan (trans-1,3,4,9,10,10a - hexahydro - 2H - 10,4a - iminoethanophenanthrene), inclusively. When distinction is necessary, normal morphinan and isomorphinan will be hereinafter designated as "morphinan (cis)" and "morphinan (trans)," respectively. The position-numbering hereinafter employed for the morphinan derivatives is that generally accepted in morphinan chemistry as shown in the above plane formula.

The objective 6-hydroxymorphinan derivative in the present invention is representable by the following plane formula:

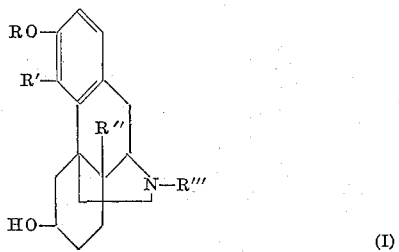

wherein R represents a hydrogen atom, a lower alkyl group (e.g. methyl, ethyl, propyl) or an acyl group such as lower alkanoyl (e.g. acetyl, propionyl, butyryl), R' represents a hydrogen atom, an aryloxy group (e.g. phenyloxy, naphthyloxy) or a substituted aryloxy group (e.g. substituted phenyloxy, substituted naphthyloxy) wherein the substituent is lower alkyl (e.g. methyl, ethyl, propyl), lower alkoxy (e.g. methoxy, ethoxy, propoxy), nitro or amino, R" represents a hydrogen atom, a hydroxyl group or an acyloxy group such as lower alkanoyloxy (e.g. acetyloxy, propionyloxy, butyryloxy), R''' represents a hydrogen atom, a lower alkyl group (e.g. methyl, ethyl, propyl) or an ar(lower)alkyl group (e.g. benzyl, phenethyl) and shows various pharmacological activities such as analgesic activity and antitussive activity.

Accordingly, a basic object of the present invention is to embody the 6-hydroxymorphinan derivative of Formula I. Another object of the invention is to embody the pharmacologically active 6-hydroxymorphinan (I). A further object of the invention is to embody a process for preparing the 6-hydroxymorphinan (I). These and other objects will be apparent to those conversant with the art to which the present invention pertains from the subsequent description.

The process of the present invention is illustratively represented by the following scheme:

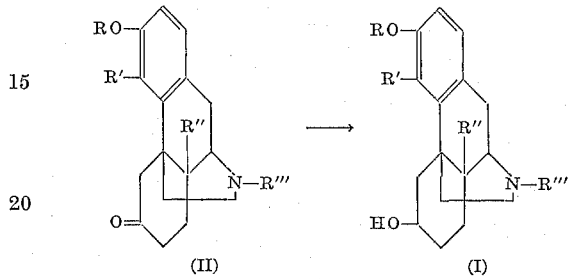

wherein R, R', R" and R''' each has the same significance as designated above and a double bond may exist on the C ring.

As the starting material, there may be used the optically active or racemic 6-oxomorphinan of Formula II.

According to the process of the present invention, the starting 6-oxomorphinan (II) is subjected to reduction to produce the 6-hydroxymorphinan (I). For attaining the object, there may be adopted various reduction procedures such as an electrolytic reduction method, a catalytic reduction method, a reduction method using alkali alkoxide, a reduction method using amalgam (e.g. sodium-amalgam, aluminum-amalgam), a reduction method using metallic hydride (e.g. lithium aluminum hydride, sodium borohydride) and Meerwein-Pondorf reduction method. The reaction medium may be suitably selected on the property of the starting 6-oxomorphinan (II) and the adopted reduction procedure. Examples of the reaction medium includes water, acetic acid, methanol, ethanol, ether, tetrahydrofuran, dioxane, chloroform, dichloromethane, benzene, toluene, etc. As the result of the reduction reaction, there is usually obtained a mixture of the 6α-hydroxymorphinan (Ia) and the 6β-hydroxymorphinan (Ib). However, either of these two isomers can be predominantly prepared by adopting a suitable reduction procedure. For instance, the catalytic reduction using acetic acid affords selectively the 6-hydroxymorphinan (I) wherein the hydroxyl group takes axial conformation, while the reduction using sodium-amalgam gives predominantly the 6-hydroxymorphinan (I) wherein the 6-hydroxyl group takes equatorial conformation. Further, for instance, the reduction using metallic hydride and the Meerwein-Pondorf reduction generally produce a mixture of the said two isomers, each being present at a considerable amount. When the mixture is obtained, each isomer can be isolated by a conventional separation procedure (e.g. chromatography, fractional recrystallization).

The objective 6-hydroxymorphinan (I) occurs in optically active form as well as in racemic mixture and these are all within the scope of the present invention.

The 6-hydroxymorphinan (I) forms acid addition salts with organic and inorganic acids. Illustrative acid addition salts include the hydrohalides (e.g. hydrochloride, hydrobromide, hydroiodide), sulfate, phosphate, nitrate, tartrate, salicylate, benzoate, malate, citrate, acetate, etc.

The thus-produced 6-hydroxymorphinan (I) and acid addition salts thereof exhibit pharmacological activity such as analgesic activity and antitussive activity. For instance, the analgesic activity, antitussive activity and toxicity of some compounds according to the present invention are shown in the following table:

TABLE

| Compound | Analgesic activity | Antitussive activity | Toxicity (LD$_{50}$, mg./kg.) |
| --- | --- | --- | --- |
| (−)-3-Methoxy-6β-hydroxy-N-methylmorphinan (cis) | 0.2 | 2.0 | 82.5 |
| (−)-3,6α-Dihydroxy-N-methylmorphinan (cis) acetate | 0.1 | 1.4 | 172.4 |

NOTE.—The analgesic activity was observed by the Haffner-Hesse method [Hesse: Arch. exp. Path. u. Pharm., Vol. 158, p. 233 (1930)] in mice and is shown as the effective ratio to morphine, the value of which is expressed as 1. The antitussive activity was observed by the Winter method [Winter et al.: J. Exper. Med., vol. 101, p. 17 (1955)] in guinea pigs and is shown as the effective ratio to codeine, the value of which is expressed as 1. The toxicity was tested by intravenous administration of the tested compound to mice.

Other 6-hydroxymorphinans (I) show the similar activities. Accordingly, they are useful as analgesic and/or antitussive agents.

Practical and presently preferred embodiments of the present invention are illustrated by the following examples. In the examples, mg.=milligram(s), g.=gram(s), ml.=millilitre(s)

and °C.=degrees centigrade. Other abbreviations have conventional meanings.

*Example 1.—Preparation of (−)-3-methoxy-6α-hydroxy-N-methylmorphinan (cis)*

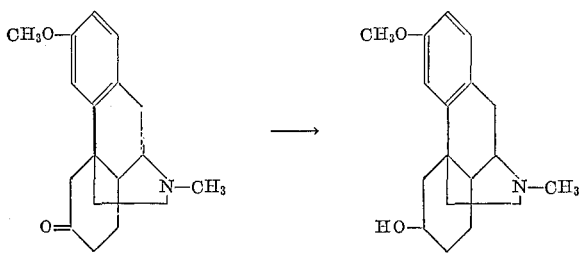

To a solution of (−)-3-methoxy-6-oxo-N-methylmorphinan (cis) (5 g.) in glacial acetic acid (50 ml.), there is added platinum dioxide (1 g.), and the resultant mixture is shaken at room temperature (10 to 30° C.) for about 10 hours in hydrogen stream. After absorption of hydrogen (1.2 molar equivalents), the reaction mixture is filtered to separate the catalyst and the filtrate evaporated to give the crude product (5.1 g.). The crude product is dissolved in ethanol while hot and combined with a solution of hydroxylamine hydrochloride and sodium acetate in water. The resulting mixture is heated on a steam bath for 2 hours. After removal of ethanol by evaporation, the resulting product is made to alkalinity with sodium hydroxide and shaken with ether. The ether layer is chromatographed on alumina to eliminate impurities. The ether solution is evaporated and the residue crystallized from ethyl acetate to give (−)-3-methoxy-6α-hydroxy-N-methylmorphinan (cis) (4.3 g.) as prisms melting at 133.5 to 134° C., [α]$_D^{32}$ −31.3° (ethanol).

*Analysis.*—Calcd. for $C_{18}H_{25}O_2N$: C, 75.22; H, 8.77; N, 4.87. Found: C, 75.22; H, 8.73; N, 4.95.

The picrate: M.P., 212 to 213° C. (crystallized from ethanol).

The tartrate: M.P., 192 to 193° C. (decomp.) (crystallized from ethanol).

The methiodide: M.P., 272 to 273° C.

The starting material of this Example, (−)-3-methoxy-6-oxo-N-methylmorphinan (cis), is a known compound [e.g. Sawa et al.: Tetrahedron, vol. 15, p. 154 (1961)].

*Example 2.—Preparation of (−)-3-methoxy-6α-hydroxy-N-methylmorphinan (cis) and (−)-3-methoxy-6β-hydroxy-N-methylmorphinan (cis)*

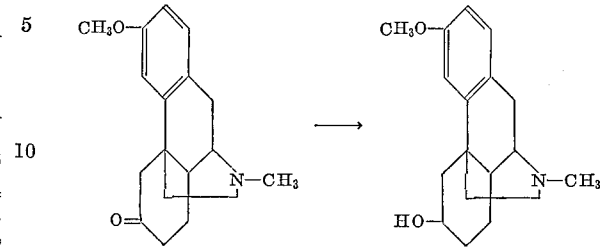

To a mixture of (−)-3-methoxy-6-oxo-N-methylmorphinan (10 g.) in 99% ethanol (250 ml.), there is added portionwise sodium borohydride (1.3 g.) in about 10 minutes. The resultant mixture is stirred for 3 hours and then allowed to stand at room temperature (10 to 30° C.) overnight. After evaporation of ethanol by distillation, there is added water. The resulting mixture is acidified with 20% acetic acid to decompose excess of sodium borohydride, made to alkalinity with ammonia-water and shaken with chloroform. The chloroform layer is washed with water and the solvent removed. The residue (10.3 g.) is chromatographed on alumina and eluted with benzene, chloroform and 2% ethanolic chloroform in turn to obtain the fraction melting at 130 to 135° C. and the fraction melting at 201 to 206° C. The former fraction is crystallized from ethyl acetate to give (−)-3-methoxy-6α-hydroxy-N-methylmorphinan (cis) (4.4 g.) as crystals melting at 134 to 135° C. The latter fraction is crystallized from ethyl acetate to give (−)-3-methoxy-6β-hydroxy-N-methylmorphinan (cis) (3.2 g.) as crystals melting at 208 to 209° C., [α]$_D^{34}$ −71.6° (ethanol).

*Analysis.*—Calcd. for $C_{18}H_{25}O_2N$: C, 75.22; H, 8.77; N, 4.87. Found: C, 75.05; H, 8.80; N, 4.69.

*Example 3.—Preparation of (−)-3,6α-dihydroxy-N-methylmorphinan (cis)*

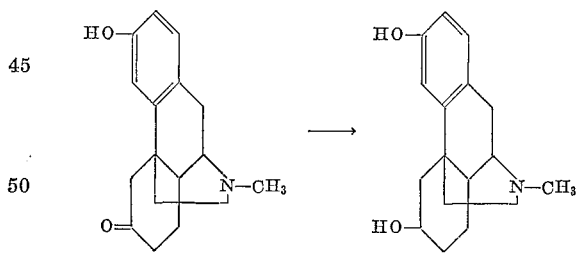

To a solution of (−)-3-hydroxy-6-oxo-N-methylmorphinan (cis) (2.5 g.) in glacial acetic acid (50 ml.), there is added platinum dioxide (375 mg.), and the resultant mixture is shaken at room temperature (10 to 30° C.) for 9.5 hours in hydrogen stream. After absorption of hydrogen (156 ml.), the reaction mixture is filtered to separate the catalyst and evaporated to remove the solvent. The residue is combined with ethanol and allowed to stand at room temperature (10 to 30° C.). The precipitate is collected by filtration and crystallized from ethanol to give (−)-3,6α-dihydroxy-N-methylmorphinan (cis) acetate (700 mg.) as crystals melting at 206 to 207° C., [α]$_D^{30}$ −25.4° (ethanol).

*Analysis.*—Calcd. for $C_{17}H_{23}O_2N \cdot C_2H_4O_2$: C, 68.44; H, 8.16; N, 4.20. Found: C, 68.37; H, 8.40; N, 4.35.

The mother liquor from which the precipitate was separated above is made to alkalinity with ammonia-water and shaken with benzene. The benzene layer is shaken with water. The water layer is combined with the ammonia-water layer above separated and shaken with chloroform. The chloroform layer is evaporated and the residue crystallized from acetone to give (−)-3,6α- dihydroxy-N-methylmorphinan (cis) (1.5 g.) as crystals moistened at 162 to 163° C. and melting at 210 to 211° C., $[\alpha]_D^{30}$ —32° (ethanol).

Analysis.—Calcd. for $C_{17}H_{23}O_2N \cdot C_3H_6O$: C, 72.46; H, 8.82; N, 4.23. Found: C, 72.71; H, 8.76; N, 4.61.

The hydrobromide: M.P., 86 to 88° C.

The starting material of this example, (—)-3-hydroxy-6-oxo-N-methylmorphinan (cis), is prepared from (—)-3-methoxy-6-oxo-N-methylmorphinan (cis) according to the following scheme:

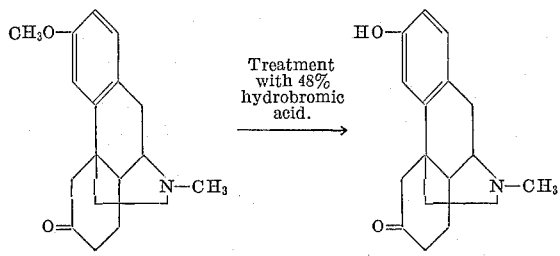

*Example 4.—Preparation of (—)-3,6β-dihydroxy-N-methylmorphinan (cis)*

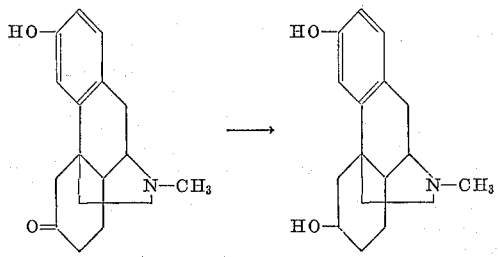

To a suspension of (—)-3-hydroxy-6-oxo-N-methylmorphinan (cis) (3 g.) in water (22.5 ml.), there is added portionwise 5% sodium-amalgam (19.3 g.) in 1.5 hours while stirring. The resultant mixture is stirred for 3 hours at room temperature (10 to 30° C.) and heated on a steam bath for 20 minutes. After separation of mercury, the reaction mixture is acidified with hydrochloric acid, made to alkalinity with ammonia-water and shaken with chloroform. The chloroform layer is evaporated and the residue crystallized from acetone to give (—)-3,6β-dihydroxy-N-methylmorphinan (cis) (1.6 g.) as crystals melting at 243 to 244° C., $[\alpha]_D^{15}$ —76.5° (ethanol).

Analysis.—Calcd. for $C_{17}H_{23}O_2N \cdot \frac{1}{4}H_2O$: C, 73.48; H, 8.53; N, 5.03. Found: C, 72.93; H, 8.63; N, 4.71.

*Example 5.—Preparation of (—)-3,6α-dihydroxy-N-methylmorphinan (cis) and (—)-3,6β-dihydroxy-N-methylmorphinan (cis)*

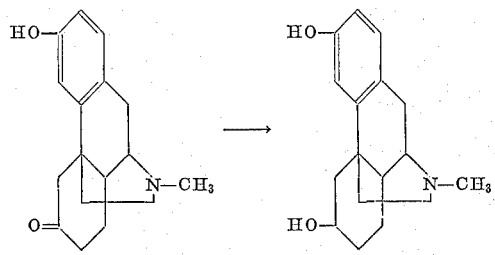

To a solution of (—)-3-hydroxy-6-oxo-N-methylmorphinan (cis) (1.8 g.) in 99% ethanol (36 ml.), there is added sodium borohydride (190 mg.), and the resultant mixture is stirred for 2 hours at room temperature (10 to 30° C.) and allowed to stand overnight. The reaction mixture is evaporated to remove ethanol. The residue is combined with water, acidified with acetic acid to decompose the reducing agent, made to alkalinity with ammonia-water and shaken with chloroform. The chloroform layer is evaporated to give a mixture (1.6 g.) of (—)-3,6α-dihydroxy-N-methylmorphinan (cis) and (—)-3,6β-dihydroxy-N-methylmorphinan (cis).

*Example 6.—Preparation of (+)-3-methoxy-4-phenyloxy-6α-hydroxy-N-methylmorphinan (cis)*

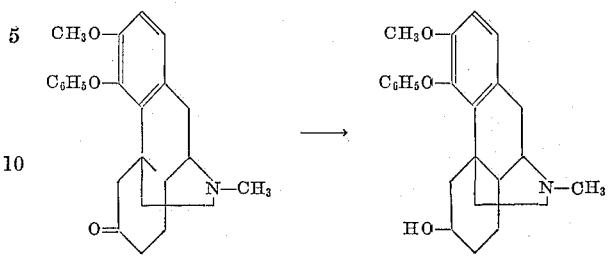

To a solution of (+)-3-methoxy-4-phenyloxy-6-oxo-N-methylmorphinan (cis) (1 g.) in glacial acetic acid (30 ml.), there is added platinum dioxide (200 mg.), and the resultant mixture is shaken at room temperature (10 to 30° C.) in hydrogen stream. After absorption of hydrogen (73 ml.) in 5 hours, the reaction mixture is filtered to separate the catalyst and evaporated to remove the solvent. The residue is dissolved in water and made to alkalinity with ammonia. The precipitate is collected by filtration to give crude (+)-3-methoxy-4-phenyloxy-6α-hydroxy-N-methylmorphinan (cis) (0.80 g.) as crystals melting at 60 to 75° C. The crude product is treated with hydriodic acid and crystallized from water to give (+)-3-methoxy-4-phenyloxy-6α-hydroxy-N-methylmorphinan (cis) hydriodide as crystals melting at 237 to 238° C., $[\alpha]_D^{17}$ +36.4° (methanol).

Analysis.—Calcd. for $C_{24}H_{29}O_3N \cdot HI \cdot \frac{1}{2}H_2O$: C, 55.82; H, 6.05; N, 2.71; I, 24.58. Found: C, 55.89; H, 6.27; N, 2.63; I, 24.79.

The starting material of this example, (+)-3-methoxy-4-phenyloxy-6-oxo-N-methylmorphinan (cis), is a known compound [Sawa et al.: Tetrahedron, vol. 15, p .154 (1961)].

*Example 7.—Preparation of (—)-3-methoxy-4-phenyloxy-6β-hydroxy-N-methylmorphinan (cis)*

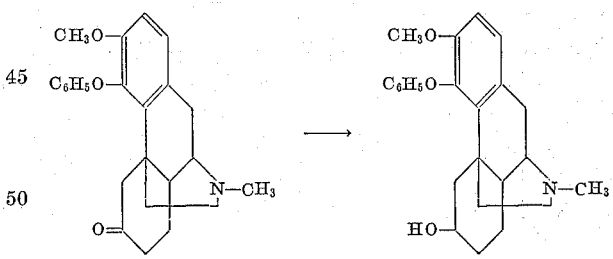

To a suspension of (+) - 3 - methoxy- 4 - phenyloxy-6-oxo-N-methylmorphinan (cis) (5.7 g.) in water (40 ml.), there are added 5% sodium-amalgam (22.8 g.) in about 30 minutes, methanol (80 ml.) and then 5% sodium-amalgam (11.4 g.) in about 30 minutes, and the resultant mixture is stirred for 3 hours at room temperature (10 to 30° C.) and heated for 20 minutes on a steam bath. After separation of mercury, methanol is evaporated from the reaction mixture. The resultant mixture is shaken with benzene. The benzene layer is evaporated. The residue is combined with hydroxylamine hydrochloride (1.0 g.), sodium acetate (2.1 g.) and methanol (50 ml.) and heated for 2 hours on a steam bath. The reaction mixture is shaken with chloroform. The chloroform layer is chromatographed on alumina. The eluate with benzene is evaporated to give (—)-3-methoxy-4-phenyloxy-6β-hydroxy-N-methylmorphinan (cis) (3.2 g.), of which the methiodide melts at 173 to 175° C. (decomp.).

Analysis.—Calcd. for $C_{24}H_{29}O_3N \cdot CH_3I \cdot H_2O$: C, 55.66; H, 6.35; N, 2.60. Found: C, 56.12; H, 6.65; N, 3.38.

*Example 8.*—*Preparation of (—)-3-methoxy-6α,14-dihydroxy-N-methylmorphinan (cis) and (—)-3-methoxy-6β,14-dihydroxy-N-methylmorphinan (cis)*

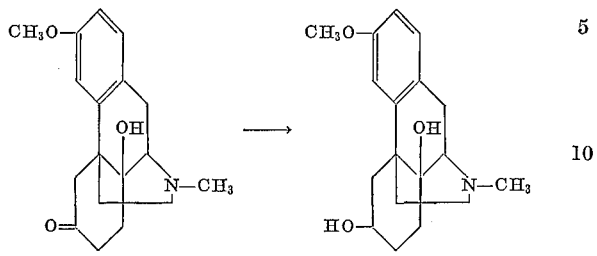

To a suspension of (—)-3-methoxy-6-oxo-14-hydroxy-N-methylmorphinan (cis) (2.0 g.) in methanol (50 ml.), there is added portionwise sodium borohydride (1 g.) while stirring at room temperature (10 to 30° C.), and the resultant mixture is stirred for 2 hours. To the reaction mixture, there are added glacial acetic acid (5 ml.) while stirring and then water (30 ml.). After removal of methanol under reduced pressure, the resulting product is neutralized with ammonia-water and shaken with chloroform. The chloroform layer is evaporated and the residue chromatographed on alumina (60 g.). The eluates with benzene-chloroform (1:1) and chloroform are evaporated and crystallized from a mixture of petroleum ether and benzene to give (—)-3-methoxy-6α,14-dihydroxy-N-methylymorphinan (cis) (650 mg.) as crystals melting at 94 to 96° C., $[\alpha]_D^{25}$ —45° (ethanol).

*Analysis.*—Calcd. for $C_{18}H_{25}O_3N$: C, 71.25; H, 8.31; N, 4.62. Found: C, 71.37; H, 8.48; N, 4.36.

The picrate: M.P., 218 to 219° C. (crystallized from methanol).

The eluate with chloroform-methanol (99:1) is evaporated and crystallized from a mixture of petroleum ether and benzene to give (—)-3-methoxy-6β,14-dihydroxy-N-methylmorphinan (cis) (882 mg.) as crystals melting at 154 to 155° C., $[\alpha]_D^{25}$ —88° (ethanol).

*Analysis.*—Calcd. for $C_{18}H_{25}O_3N$: C, 71.25; H, 8.31; N, 4.62. Found: C, 71.37; H, 8.31; N, 4.36.

The starting material of this example, (—)-3-methoxy-6-oxo-14-hydroxy-N-methylmorphinan (cis), is prepared from thebaine according to the following scheme:

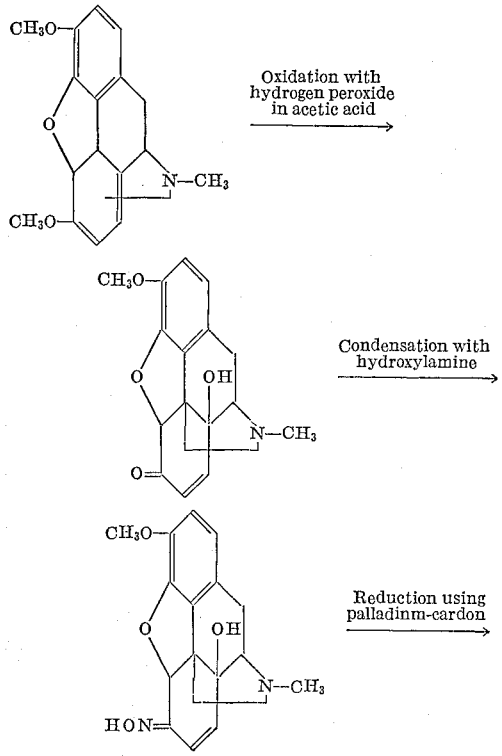

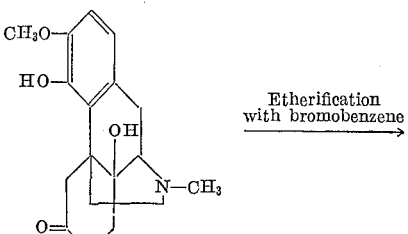

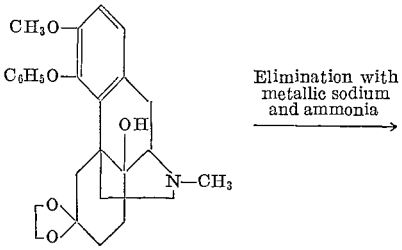

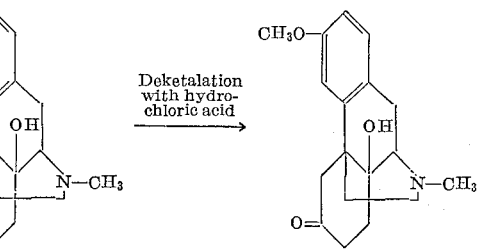

*Example 9.*—*Preparation of (—)-3,6α,14-trihydroxy-N-methylmorphinan (cis) and (—)-3,6β,14-trihydroxy-N-methylmorphinan (cis)*

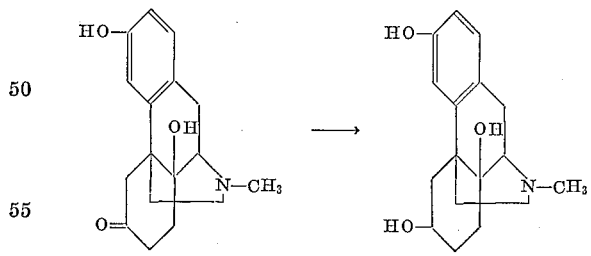

To a suspension of (—)-3,14-dihydroxy-6-oxo-N-methylmorphinan (cis) (1.0 g.) in methanol (20 ml.), there is added portionwise sodium borohydride (0.5 g.) while stirring at room temperature (10 to 30° C.), and the resultant mixture is stirred for 1 hour. To the reaction mixture, there are added glacial acetic acid (5 ml.) and water (20 ml., and the resulting mixture is stirred for 30 minutes. After removal of methanol by distillation under reduced pressure, the resulting product is neutralized with ammonia-water, saturated with sodium chloride and shaken with chloroform. The chlororform layer is evaporated and the residue chromatographed on alumina (30 g.). The eluate with chloroform-methanol (98:2) is evaporated to give crude (—)-3,6α,14-trihydroxy-N-methylmorphinan (cis) 508 mg.). The crude product is treated with hydrochloric acid and crystallized from a mixture of water and acetone to give (—)-3,6α,14-trihydroxy-N-methylmorphinan (cis) hydrochloride as crystals foaming at 100° C., solidifying at 110° C. and melting at 167 to 190° C., $[\alpha]_D^{23}$ —18° (ethanol).

Analysis.—Calcd. for $C_{17}H_{23}O_3N \cdot HCl \cdot 2.5H_2O$: C, 55.05; H, 7.88; N, 3.78; Cl, 9.56. Found: C, 55.33; H, 7.94; N, 4.03; Cl, 10.01.

The eluate with chloroform-methanol (95:5) is evaporated and crystallized from ethanol to give (—)-3,6β,14-trihydroxy-N-methylmorphinan (cis) (155 mg.) as crystals melting at 215 to 216° C. (moistened at 120° C.), $[\alpha]_D^{29}$ —83° (ethanol).

Analysis.—Calcd. for $C_{17}H_{23}O_3N \cdot C_2H_5OH$: C, 68.03; H, 8.71; N, 4.18. Found: C, 67.86; H, 8.75; N, 4.33.

The starting material of this example, (—)-3,14-dihydroxy-6-oxo-N-methylmorphinan (cis), is prepared from (—)-3-methoxy-6-oxo-14-hydroxy-N-methylmorphinan (cis) [cf. Example 9 of this specification] according to the following scheme:

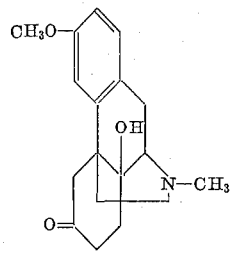 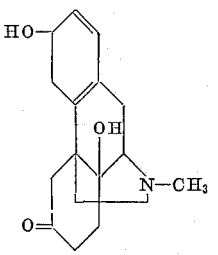

*Example 10.—Preparation of (—)-3,6β,14-trihydroxy-N-methylmorphinan (cis)*

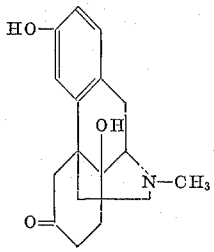 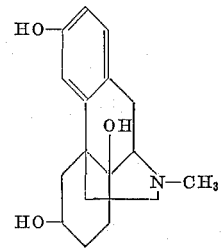

To a suspension of (—)-3,14-dihydroxy-6-oxo-N-methylmorphinan (cis) (1.0 g.) in water (10 ml.), there is added portionwise 5% sodium-amalgam (6.5 g.) in 1 hour, and the resultant mixture is stirred for 2.5 hours at room temperature (10 to 30° C.) and then heated at 85° C. for 30 minutes. After separation of mercury by filtration, the filtrate is acidified wih hydrochloric acid, made to alkalinity with ammonia-water, saturated with sodium chloride and shaken with chloroform. The chloroform layer is evaporated and the residue (1.1 g.) chromatographed on alumina (30 g.). After recovery of the starting material (488 mg.) from the eluate with chloroform-methanol (98:2), there is obtained (—)-3,6β,14-trihydroxy-N-methylmorphinan (cis) (525 mg.) from the eluate with chloroform-methanol (95:5) as crystals melting at 215 to 216° C. (crystallized from ethanol).

*Example 11.—Preparation of (—)-3-methoxy-6β-hydroxy-N-methylmorphinan (trans)*

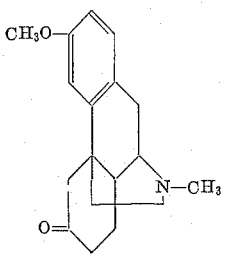 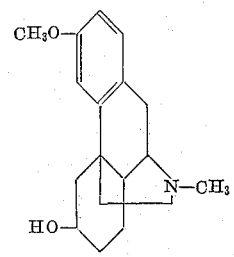

To a solution of (—)-3-methoxy-6-oxo-N-methylmorphinan (trans) (1.43 g.) in ethanol (50 ml.), there is added portionwise sodium borohydride (1.90 g.), and the resultant mixture is stirred for 3 hours at room temperature (10 to 30° C.). The reaction mixture is evaporated and the resultant oil chromatographed on alumina (24 g.). The eluate with benzene is evaporated to give (—)-3-methoxy-6β-hydroxy-N-methylmorphinan (trans) (1.13 g.) as an oil. $[\alpha]_D^{31}$ —46.7° (chloroform). The oil is treated with picric acid in ethanol and crystallized from a mixture of ether and ethanol to give (—)-3-methoxy-6β-hydroxy-N-methylmorphinan (trans) picrate as crystals melting at 210 to 212° C. (decomp.).

Analysis.—Calcd. for $C_{18}H_{25}O_2N \cdot C_6H_3O_7N_3$: C, 55.81; H, 5.46; N, 10.85. Found: C, 55.75; H, 5.79; N, 10.84.

The eluate with chloroform-methanol (98:2) is again subjected to chromatography for purification to give the additional oil (123 mg.) of the objective compound.

The starting material of this example, (—)-3-methoxy-6-oxo-N-methylmorphinan (trans), is prepared from (—)-3,6-dimethoxy-N-methyl-$\Delta^{5,8}$-morphinan (cis) according to the following scheme:

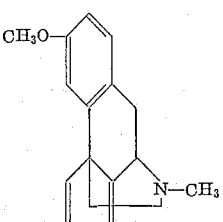

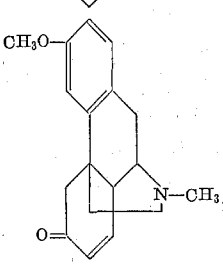

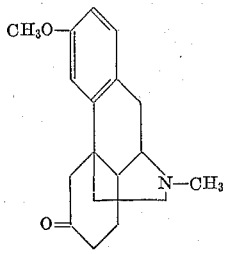 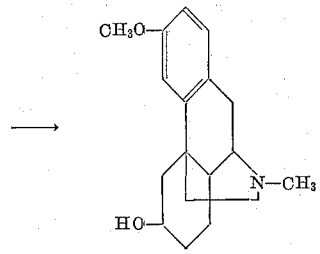

*Example 12.—Preparation of (—)-3-methoxy-6β-hydroxy-N-methylmorphinan (trans)*

To a solution of (—)-3-methoxy-6-oxo-N-methylmorphinan (trans) (143 mg.) in glacial acetic acid (30 ml.), there is added platinum dioxide (150 mg.), and the resultant mixture is shaken for 18 hours at 25° C. in hydrogen stream. After absorption of hydrogen (15 ml.), the reaction mixture is filtered to separate the catalyst and the filtrate evaporated to remove acetic acid. The residue is combined with water, made to alkalinity with ammonia and shaken with benzene. The water layer is shaken with chloroform. The chloroform layer is combined with the benzene layer and evaporated to give (—)-3-methoxy-6β-hydroxy-N-methylmorphinan (trans) (131 mg.) as an oil.

*Example 13.—Preparation of (+)-3-methoxy-4-phenyloxy-6α-hydroxy-N-methylmorphinan (cis) and (—)-3 - methoxy - 4 - phenyloxy - 6β - hydroxy - N-methylmorphinan (cis)*

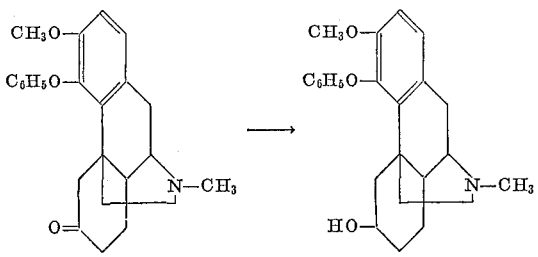

To a mixture of (+)-3-methoxy-4-phenyloxy-6-oxo-N-methylmorphinan (cis) (7.55 g.), aluminum triisopropoxide (8.2 g.) and isopropanol (60 ml.), there is added dropwise isopropanol (100 ml.) while heating whereby the produced acetone is distilled off. After the distillation of acetone is completed in 90 minutes, the reaction mixture is evaporated to remove isopropanol. The residue is combined with water (20 ml.) to decompose excess of aluminum triisopropoxide, treated with 10% sodium hydroxide to dissolve the precipitated aluminum hydroxide and shaken with chloroform. The chloroform layer is evaporated and chromatographed on alumina (264 mg.). The eluates with benzene, benzene-chloroform (1:1) and chloroform are evaporated, treated with dilute hydrochloric acid and crystallized from water to give (+)-3-methoxy-4-phenyloxy-6α-hydroxy-N-methylmorphinan (cis) hydrochloride (3.48 g.) as crystals melting at 253 to 254° C. (decomp.). $[\alpha]_D^{23}$ +34.3° (water).

*Analysis.*—Calcd. for $C_{24}H_{29}O_3N \cdot HCl \cdot H_2O$: C, 66.42; H, 7.43; N, 3.23. Found: C, 66.34; H, 7.44; N, 3.27.

The hydrochloride is treated with sodium hydroxide in water and crystallized from ether to give (+)-3-methoxy-4-phenyloxy-6α-hydroxy-N-methylmorphinan (cis) as crystals melting at 106 to 107.5° C., $[\alpha]_D^{23.5}$ +26.8° (ethanol).

*Analysis.*—Calcd. for $C_{24}H_{29}O_3N$: C, 75.96; H, 7.70; N, 3.69. Found: C, 75.83; H, 8.07; N, 3.83.

The eluates with chloroform and chloroform-ethanol (99:1) are evaporated and crystallized from ether to give (—) - 3 - methoxy - 4 - phenyloxy - 6β - hydroxy - N-methylmorphinan (cis) (2.98 g.) as crystals melting at 137 to 138° C., $[\alpha]_D^{23}$ —7.0 (ethanol).

*Analysis.*—Calcd. for $C_{24}H_{29}O_3N \cdot H_2O$: C, 72.51; H, 7.86; N, 3.52; $H_2O$, 4.53. Found: C, 72.64; H, 8.04; N, 3.69; $H_2O$, 4.36.

*Example 14.—Preparation of (—)-3-acetyloxy-6α-hydroxy-N-methylmorphinan (cis)*

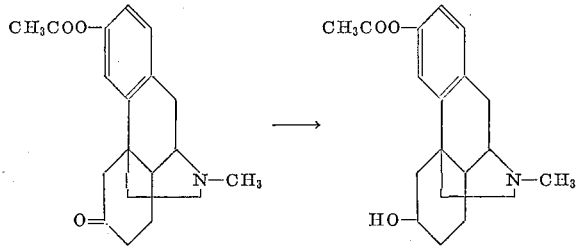

To a solution of (—)-3-acetyloxy-6-oxo-N-methylmorphinan (cis) (150 mg.) in glacial acetic acid (10 ml.), there is added platinum dioxide (80 mg.), and the resultant mixture is shaken at room temperature (10 to 30° C.) for 9 hours in hydrogen stream. The reaction mixture is filtered to separate the catalyst and evaporated to remove acetic acid. The residue is combined with water, made to alkalinity with ammonia and shaken with benzene. The benzene layer is evaporated to give (—)-3-acetyloxy-6α-hydroxy-N-methylmorphinan (cis) (53 mg.) as crystals melting at 88 to 92° C. (moistened at 70° C.).

The starting material of this example, (—)-3-acetyloxy-6-oxo-N-methylmorphinan (cis), is prepared from (—)-3-hydroxy-6-oxo-N-methylmorphinan (cis) [cf. Example 3 of this specification] according to the following scheme:

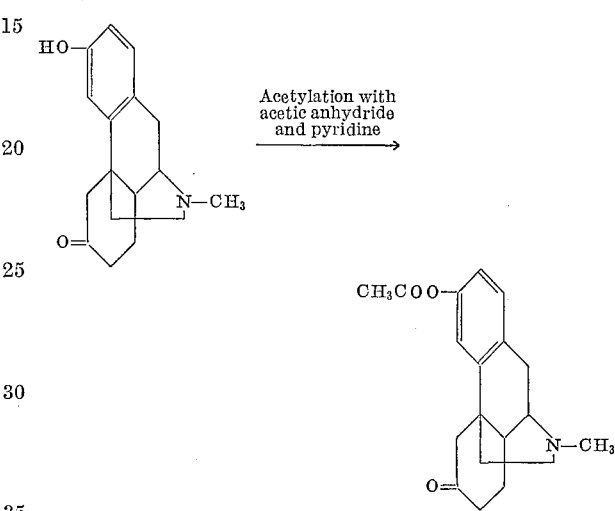

*Example 15.—Preparation of (—)-3-methoxy-6α-hydroxy-N-methylmorphinan (trans)*

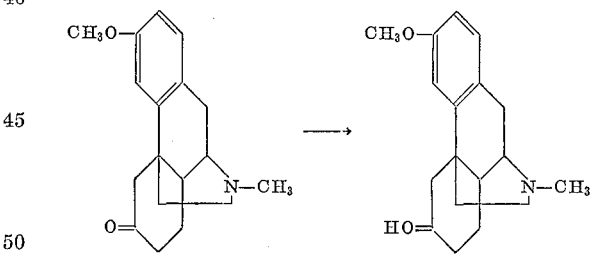

To a solution of (—)-3-methoxy-6-oxo-N-methylmorphinan (trans) (571 mg.) in ethanol (50 ml.), there are added metallic sodium (9.2 g.) in 30 minutes while ice-cooling and then ethanol (20 ml.), and the resultant mixture is allowed to stand at room temperature (10 to 30° C.) for about 1 hour. The reaction mixture is combined with water (50 ml.) and condensed under reduced pressure to a half volume. After cooling, the condensate is shaken with ether. The ether extract is evaporated and the resultant oil (520 mg.) chromatographed on alumina (15 g.). After recovery of the starting material (61 mg.) from the eluate with benzene, the eluate with chloroform is evaporated and crystallized from a mixture of methanol and water to give (—)-3-methoxy-6α-hydroxy-N-methylmorphinan (trans) (299 mg.) as crystals melting at 126° C., $[\alpha]_D^{28}$ —58.8° (chloroform).

*Analysis.*—Calcd. for $C_{18}H_{25}O_2N$: C, 75.22; H, 8.77; N, 4.87. Found: C, 74.97; H, 8.84; N, 4.56.

What is claimed is:

(—)-3,6α-dihydroxy-N-methylmorphinan (cis).

(References on following page)

References Cited by the Examiner

UNITED STATES PATENTS 3,085,091  4/1963  Sawa et al. _____ 260—285

FOREIGN PATENTS 761,974  11/1956  Great Britain.

OTHER REFERENCES

Bentley: "The Chemistry of Morphine Alkaloids," Oxford, 1954, pp. 29, 54, 254, 336 and 351 relied upon.

Gates et al.: J. Am. Chem. Soc., vol. 78, pp. 1380–1393 (1956).

Hartung: Ind. Eng. Chem., vol. 37, pp. 126–127 (1945).

ALEX MAZEL, *Primary Examiner.*

NICHOLAS S. RIZZO, *Examiner.*

DON M. KERR, DONALD G. DAUS,
*Assistant Examiners.*